(12) United States Patent
Lin et al.

(10) Patent No.: US 11,588,826 B1
(45) Date of Patent: Feb. 21, 2023

(54) DOMAIN NAME PERMUTATION

(71) Applicant: Rapid7, Inc., Boston, MA (US)

(72) Inventors: Wah-Kwan Lin, Melrose, MA (US); Paul Deardorff, Durham, NC (US)

(73) Assignee: Rapid7, Inc., Boston, MA (US)

( * ) Notice: Subject to any disclaimer, the term of this patent is extended or adjusted under 35 U.S.C. 154(b) by 423 days.

(21) Appl. No.: 16/723,102

(22) Filed: Dec. 20, 2019

(51) Int. Cl.
*H04L 9/40* (2022.01)
*H04L 61/3015* (2022.01)

(52) U.S. Cl.
CPC ...... *H04L 63/1416* (2013.01); *H04L 63/1491* (2013.01); *H04L 61/3015* (2013.01); *H04L 63/1483* (2013.01)

(58) Field of Classification Search
CPC ............. H04L 63/1416; H04L 63/1491; H04L 61/3015; H04L 63/1483; H04L 9/40
See application file for complete search history.

(56) References Cited

U.S. PATENT DOCUMENTS

| | | | | |
|---|---|---|---|---|
| 8,578,481 | B2 * | 11/2013 | Rowley | H04L 61/30 726/22 |
| 2008/0082662 | A1 * | 4/2008 | Dandliker | H04L 63/10 709/225 |
| 2010/0154055 | A1 * | 6/2010 | Hansen | H04L 63/1483 707/E17.014 |
| 2011/0276716 | A1 * | 11/2011 | Coulson | H04L 63/1483 709/238 |
| 2016/0381056 | A1 * | 12/2016 | Floering | G06F 21/51 726/23 |
| 2020/0053119 | A1 * | 2/2020 | Schnieders | H04L 63/101 |
| 2020/0099716 | A1 * | 3/2020 | Sjouwerman | H04L 63/1416 |
| 2021/0006592 | A1 * | 1/2021 | Heyman | H04L 63/1483 |
| 2021/0120035 | A1 * | 4/2021 | Onut | H04L 63/1483 |

FOREIGN PATENT DOCUMENTS

IN     201941050222 A   *   12/2019

\* cited by examiner

*Primary Examiner* — Jayesh M Jhaveri
(74) *Attorney, Agent, or Firm* — Ashwin Anand

(57) ABSTRACT

Methods and systems for identifying a network threat are disclosed. The methods described herein may involve receiving at least one permutation of a domain name, wherein the at least one permutation is registered with a domain name registrar. The methods described herein may further involve executing a scanning function to identify an active service on the at least one permutation registered with the domain name registrar and implementing a threat prevention procedure upon identifying an active service on the at least one permutation.

20 Claims, 6 Drawing Sheets

DOMAIN NAME PERMUTATION

TECHNICAL FIELD

Embodiments described herein relate to methods and systems for monitoring network activity and, more particularly but not exclusively, to methods and systems for monitoring network activity to identify network threats.

BACKGROUND

Due to their prevalence in today's society, the internet and other types of networks have become hubs for criminal activity. Often times cyber-criminals or other threat actors attempt to install or otherwise deploy harmful applications on unprotected systems. Once a threat actor obtains access to a target system or device, they may perform further actions such as stealing data, escalating their privileges, or the like.

Oftentimes, malicious actors gain access to networks by registering a fake domain name that is reminiscent of a legitimate domain name. The malicious actors may then use this fake domain name to engage in targeted attacks against employees, customers, or service providers that would typically interact with the owner of the legitimate domain name.

Defenders generally maintain a reactive posture to address these fake domains, and respond only when informed of the fake domain name or when some malicious event has occurred. For example, security personnel often address phishing campaigns only after they have been launched against unsuspecting personnel. At that point, the malicious actors may have already gained access to a network and may perform additional malicious actions.

A need exists, therefore, for systems and methods that identify these types of network threats.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

In one aspect, embodiments relate to a method for identifying a network threat. The method includes receiving at least one permutation of a domain name; wherein the at least one permutation is registered with a domain name registrar; executing a scanning function to identify an active service on the at least one permutation registered with the domain name registrar; and implementing a threat prevention procedure upon identifying an active service on the at least one permutation.

In some embodiments, the method further includes receiving network activity data regarding at least one network device on a network, and analyzing the network activity data to determine whether a network device has interacted with the active service, wherein the threat prevention procedure is implemented upon determining that the network device has interacted with the active service. In some embodiments, the network device is selected from the group consisting of a honeypot device and a file transfer protocol (FTP) server. In some embodiments, the network device is an asset on a network and associated with a user.

In some embodiments, the method further includes executing a domain name resolution function to determine whether the at least one permutation resolves, wherein the threat prevention procedure is implemented upon identifying an active service on the at least one permutation resolves.

In some embodiments, the method further includes consulting a database of a list of expected domain names and filtering a permutation that matches an expected domain name.

In some embodiments, the active service is selected from the group consisting of an HTTP service, an HTTPS service, an SMTP service, a DNS service, an NTP service, and a DHCP service.

In some embodiments, implementing the threat prevention procedure includes at least one of blocking a user associated with a network device from interacting with the permutation, preventing communications from the permutation, and blacklisting the permutation.

In some embodiments, receiving the at least one permutation includes receiving a domain name of interest, executing a function to generate a plurality of permutations of the received domain name of interest, and generating a list of permutated domain names from the generated plurality of permutations.

In some embodiments, executing the scanning function further involves determining at least one of which ports are open and what services are running on the at least one permutation.

According to another aspect, embodiments relate to a system for identifying a network threat. The system includes an interface for receiving at least one permutation of a domain name, wherein the permutation is registered with a domain name registrar; and a processor executing instructions stored on memory and configured to execute a scanning function to identify an active service on the at least one permutation registered with the domain name registrar and implement a threat prevention procedure upon identifying an active service on the at least one permutation.

In some embodiments, the interface is further configured to receive network activity data regarding at least one network device on a network, and the processor is further configured to analyze the network activity data to determine whether a network device has interacted with the active service, and wherein the threat prevention procedure is implemented upon determining that the network device has interacted with the active service. In some embodiments, the network device is selected from the group consisting of a honeypot device and a file transfer protocol (FTP) server. In some embodiments, the network device is an asset on a network and associated with a user.

In some embodiments, the processor is further configured to execute a domain name resolution function to determine whether the at least one permutation resolves, wherein the threat prevention procedure is implemented upon identifying an active service on the at least one permutation resolves.

In some embodiments, the processor is further configured to consult a database of a list of expected domain names and filter a permutation that matches an expected domain name.

In some embodiments, the active service is selected from the group consisting of an HTTP service, an HTTPS service, an SMTP service, a DNS service, an NTP service, and a DHCP service.

In some embodiments, the threat prevention procedure includes at least one of blocking a user associated with a network device from interacting with the permutation, preventing communications from the permutation, and blacklisting the permutation.

In some embodiments, the interface is further configured to receive a domain name of interest, and the processor is further configured to execute a function to generate a plurality of permutations of the received domain name of interest and generate a list of permutated domain names from the generated plurality of permutations.

In some embodiments, the processor is further configured to determine at least one of which ports are open and what services are running on the at least one permutation.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
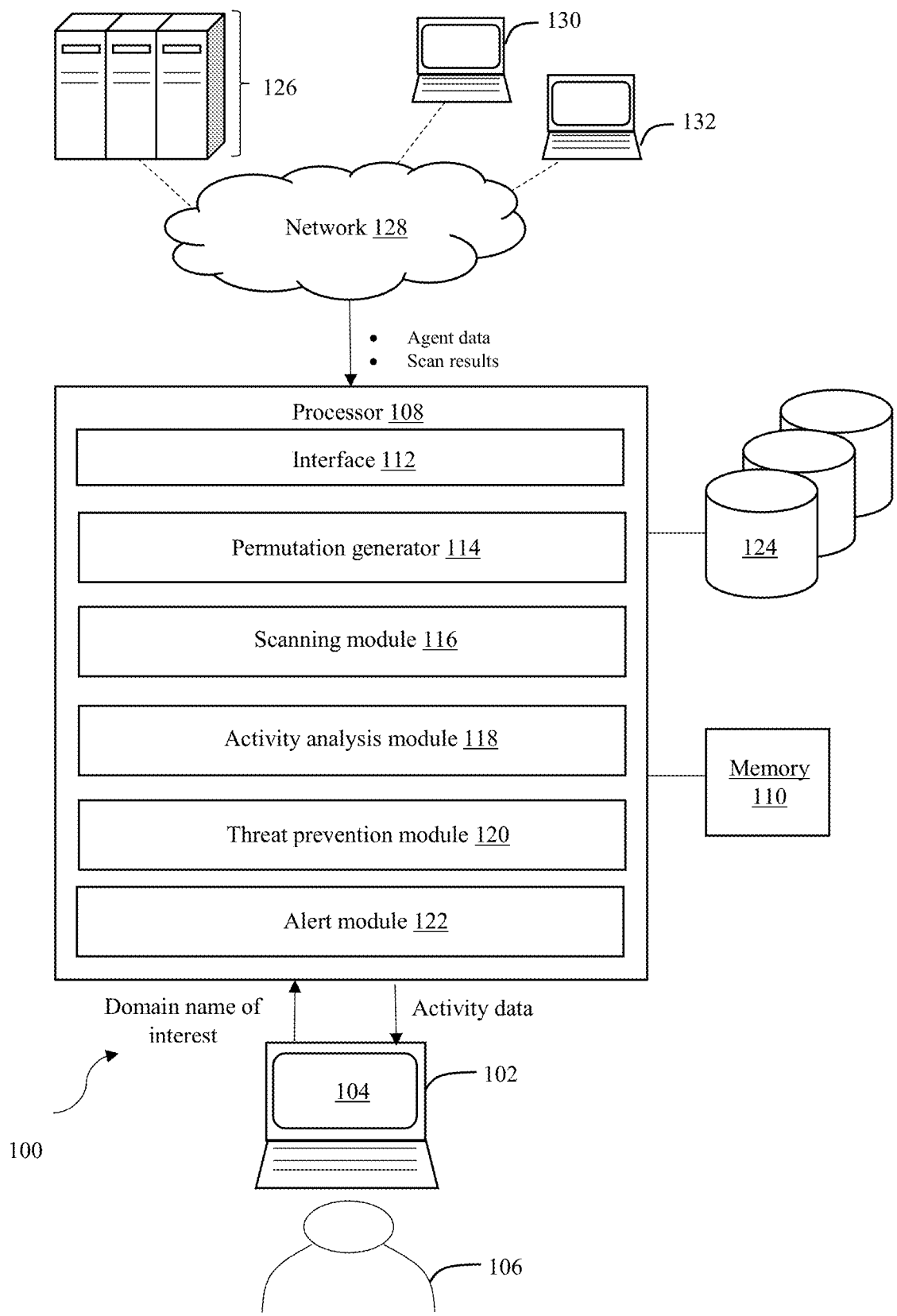
FIG. 1 illustrates a system for identifying a network threat in accordance with one embodiment.

As discussed previously, malicious actors often register a domain name with a domain name registrar, wherein their registered domain name is a minor variant (for simplicity, defined herein to be a "permutation," "permuted," etc.) of a legitimate domain name. In many cases, these legitimate domain names are associated with an organization. Malicious actors will register these permutated domain names that are similar to a legitimate domain name to, for example, present fake webpages to deliver false information to unsuspecting viewers or to collect information from unsuspecting visitors.

Additionally or alternatively, malicious actors may use permutated domains as origination points for emails purporting to be from individuals with legitimate organizations. For example, a malicious actor may send to an employee an email that at first glance appears to be sent from the employee's organization (i.e., their place of employment) but is in actuality sent from a domain similar to that of the employee's organization. In these types of attacks, also known as phishing attacks or campaigns, the employee may be under the mistaken belief that the email was sent from their employer and is trustworthy. The employee would therefore have no reason not to click on a link in the email, open an attachment from the email, or the like.

As an example, a malicious actor targeting Rapid7, Inc. with a phishing campaign might register the permutated name "Raipd7" with a domain name registrar. This permutated domain name could host a webpage that mimics a login page to a Rapid7, Inc. product or company resource.

If an employee mistakenly typed "raipd7.com" into their browser, they could be presented with this fake login page. Unaware of their mistake, they may input their credentials (e.g., usernames, passwords, etc.) or other sensitive information into a prompt thinking they are dealing with a trustworthy page. In actuality, they may be providing this sensitive information to the malicious actor that registered the permutated domain name and designed the landing page to appear trustworthy.

As another example, a malicious actor may register a permutated name with a domain name registrar, and then leverage the fake domain to launch an email campaign intended to trigger particular actions. For example, a malicious actor may email an employee of the finance department of Rapid7, Inc. from wsmith@raipd7.com demanding a transfer of funds. An unsuspecting finance department employee could mistakenly believe they are dealing with a trusted employee of Rapid7, Inc. and initiate a fund transfer.

DNStwist is a tool that can enumerate permutations of a given domain. This tool can be configured to generate and return possible permutations of a domain name of interest, and can also return only permutations that have been registered with a registrar and are resolvable. However, simply knowing that a permutated domain name is registered does not reveal why the permutated name was registered or for what it has been configured.

The systems and methods of the embodiments described herein may generate or otherwise receive a list of permutations of a domain name of interest. The systems and methods described herein may then scan one or more networks to collect a volume of data regarding activities related to the permutated domains, including details regarding open ports and services on these domains.

For example, a domain name of interest may be "Rapid7." The systems and methods described herein may execute a tool such as DNStwist to generate a list of permutated domain names that appear similar to but are different from "Rapid7."

The systems and methods described herein may then implement network scanning techniques to scan these permutated domain names. Specifically, the systems and methods may scan these permutated domain names to determine, for example, which ports are open on these domain names, which services are executing, or the like. Essentially this step determines what these permutated domain names are being used for or otherwise how they are configured.

The systems and methods described herein may then search honeypot data and captured traffic data to determine whether anyone within the organization has interacted with the permutated domain(s), or if the permutated domain(s) have contacted or at least attempted to contact any legitimate assets or honeypots within the organization. Security personnel may then take any threat mitigation techniques, such as blacklisting permutated domain names from accessing an organization's network, isolating users that have interacted with the permutated domain names, or the like.

By enumerating the list of registered permutations of domain names of interest, and then scanning them for protocols and services running on these fake domains, defenders can identify cases of possible malicious activity using fake domains. Once informed, defenders can proactively address potential threats before they cause any actual harm.

FIG. 1 illustrates a system 100 for identifying a network threat in accordance with one embodiment. The system 100 may include one or more user devices 102 executing a user interface 104 for presentation to a user 106. The user 106 may be a network administrator of an organization or otherwise someone interested in monitoring the security of an organization's network. In this case, the user 106 may be interested in determining whether employees of an organization have interacted with a permutated domain name.

In the context of the present application, the term "organization" may refer to a corporation, a partnership, a business entity, a non-profit organization, a government entity, an administrative body, an educational institution, or any other type of entity that may be associated with a network. Similarly, the term "employee" may refer to any type of person that joins or is otherwise able to perform some activity on the organization's network. These may include personnel beyond conventional, salaried employees, but may include independent contractors, guests, auditors, or the like.

The user device 102 may be in operable communication with one or more processors 108. The processor(s) 108 may be any hardware device capable of executing instructions stored on memory 110 to accomplish the objectives of the various embodiments described herein. The processor(s) 108 may be implemented as software executing on a microprocessor, a field programmable gate array (FPGA), an application-specific integrated circuit (ASIC), or another similar device whether available now or invented hereafter.

In some embodiments, such as those relying on one or more ASICs, the functionality described as being provided in part via software may instead be configured into the design of the ASICs and, as such, the associated software may be omitted. The processor(s) 108 may be configured as part of the user device 102 on which the user interface 104 executes, such as a laptop, or may be located on a different computing device, perhaps at some remote location.

The processor 108 may execute instructions stored on memory 110 to provide various modules to accomplish the objectives of the various embodiments described herein. Specifically, the processor 108 may execute or otherwise include an interface 112, a permutation generator 114, a scanning module 116, an activity analysis module 118, a threat prevention module 120, and an alert module 122.

The interface 112 may receive a domain name of interest from the user 106. This domain name of interest may be a legitimate domain such as one that is associated with an organization. The user 106 may be a security personnel tasked with determining whether employees of the organization have interacted with permutations of the domain name of interest or vice versa.

Figure 2:
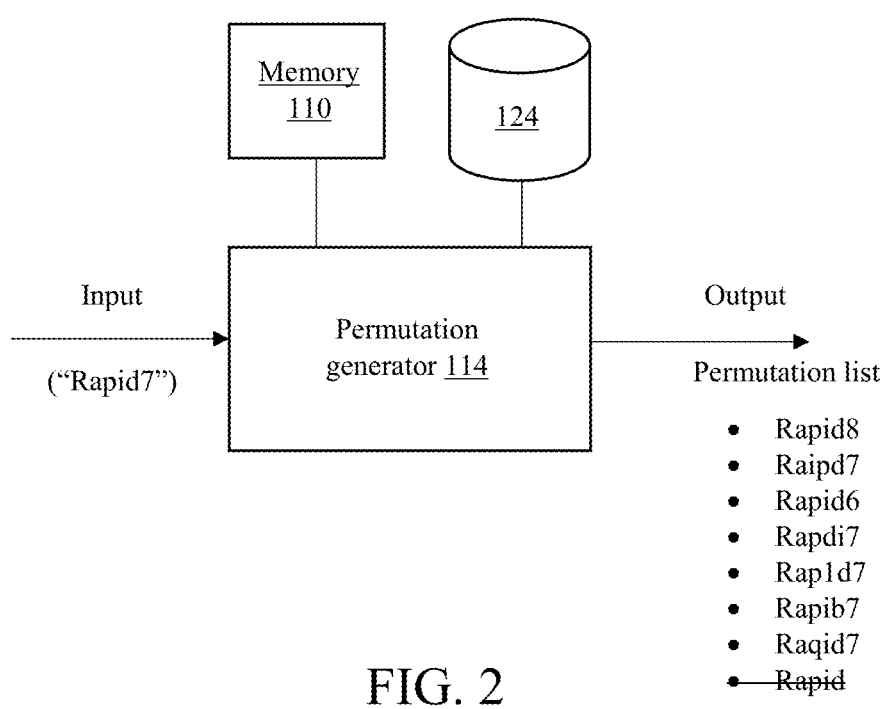
FIG. 2 illustrates the permutation generator of FIG. 1 generating a plurality of permutated domain names in accordance with one embodiment.

The domain name of interest may be communicated to the permutation generator 114, which may then generate a plurality of permutations (i.e., "permutated domain names") based on the domain name of interest. For example, FIG. 2 illustrates the permutation generator 114 of FIG. 1 receiving the legitimate domain name of interest "Rapid7" as input.

The permutation generator 114 may execute instructions stored in memory 110 to generate a plurality of permutations. Essentially, the received domain name of interest represents a string and the permutation generator 114 may run permutations by switching characters, changing numbers, or the like.

The generated list may include a plurality of names that are similar to "Rapid7" but are different to some degree. For example, a generated list of permutations may include Rapid8, Raipd7, Rapid6, Rapdi7, etc. Accordingly, these permutations are different than "Rapid7" but are similar such that an unsuspecting user may not notice the domain name is slightly different.

The memory 110 may include instructions regarding, for example, how many permutations to generate as well as how close or similar to the legitimate domain name a permutation can be in order to qualify as a permutation. Although the permutation generator 114 is shown in FIG. 2 as receiving only one legitimate domain name of interest (and generating permutations thereof), the permutation generator 114 may receive and provide permutations for multiple received domain names of interest.

The permutation generator 114 may also consult one or more databases 124 to determine if a permutation matches an expected domain name. Not all permutations may be of concern for the user 106, such as permutations that are also registered by the organization. For example, in this case "Rapid" is a permutation that would not be of interest to the user 106 or the organization as another, separate but legitimate organization owns the domain "Rapid." Accordingly, the permutation generator 114 may filter these expected permutations as they would likely not be relevant.

The permutation generator 114 may also execute one or more of a plurality of machine learning procedures during the permutation generation process. This may help generate an appropriate number of domain names that are relevant for the organization's analysis, but not so encompassing such that irrelevant permutations are returned.

The permutation generator 114 may also confirm that the generated permutations are registered with a registrar. For example, the permutation generator 114 may query registrars to determine if the generated permutations are registered therewith.

Additionally, the processor 108 may confirm that the permutated domains resolve. That is, that there are actually DNS records that are associated with the permutated domains. This ensures that permutations that are merely registered but not resolving are not returned. For example, a threat actor can register a domain name with a registrar, but ultimately not set up any records or otherwise perform any further activity in connection with the registered domain. These non-resolving domains may not be of interest to the user 106, as these domains likely would not be interacting with employees of the organization.

The systems and methods of the embodiments herein may generate this list, or they may receive this type of list from another entity. For example, and as discussed previously, DNStwist is a publicly available tool that may be used to generate and provide the permutations.

The scanning module 116 may then perform a targeted scan of the permutated domain names 126 over one or more networks 128. The network(s) 128 may link the various assets and components with various types of network connections. The network(s) 128 may be comprised of, or may interface to, any one or more of the Internet, an intranet, a Personal Area Network (PAN), a Local Area Network (LAN), a Wide Area Network (WAN), a Metropolitan Area Network (MAN), a storage area network (SAN), a frame relay connection, an Advanced Intelligent Network (AIN) connection, a synchronous optical network (SONET) connection, a digital T1, T3, E1, or E3 line, a Digital Data Service (DDS) connection, a Digital Subscriber Line (DSL) connection, an Ethernet connection, an Integrated Services Digital Network (ISDN) line, a dial-up port such as a V.90, a V.34, or a V.34bis analog modem connection, a cable modem, an Asynchronous Transfer Mode (ATM) connection, a Fiber Distributed Data Interface (FDDI) connection, a Copper Distributed Data Interface (CDDI) connection, or an optical/DWDM network.

The network(s) 128 may also comprise, include, or interface to any one or more of a Wireless Application Protocol (WAP) link, a Wi-Fi link, a microwave link, a General Packet Radio Service (GPRS) link, a Global System for Mobile Communication G(SM) link, a Code Division Multiple Access (CDMA) link, or a Time Division Multiple access (TDMA) link such as a cellular phone channel, a Global Positioning System (GPS) link, a cellular digital packet data (CDPD) link, a Research in Motion, Limited (RIM) duplex paging type device, a Bluetooth radio link, or an IEEE 802.11-based link.

Figure 3A:
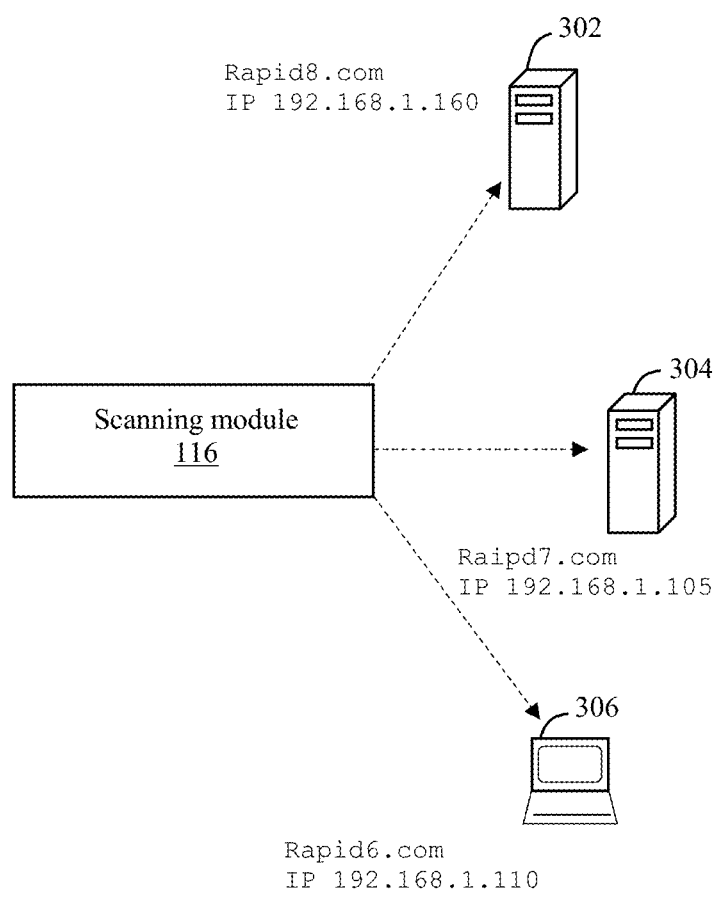
FIGS. 3A-C illustrate the scanning module of FIG. 1 scanning a plurality of permutated domain names in accordance with one embodiment.

FIG. 3A illustrates the scanning module 116 of FIG. 1 performing scans of permutated domains 302, 304, and 306. Domain 302 corresponds to Rapid8.com, domain 304 corresponds to Raipd7.com, and domain 306 corresponds to Rapid6.com. Each of these domain names are associated with an IP address.

Figure 3B:
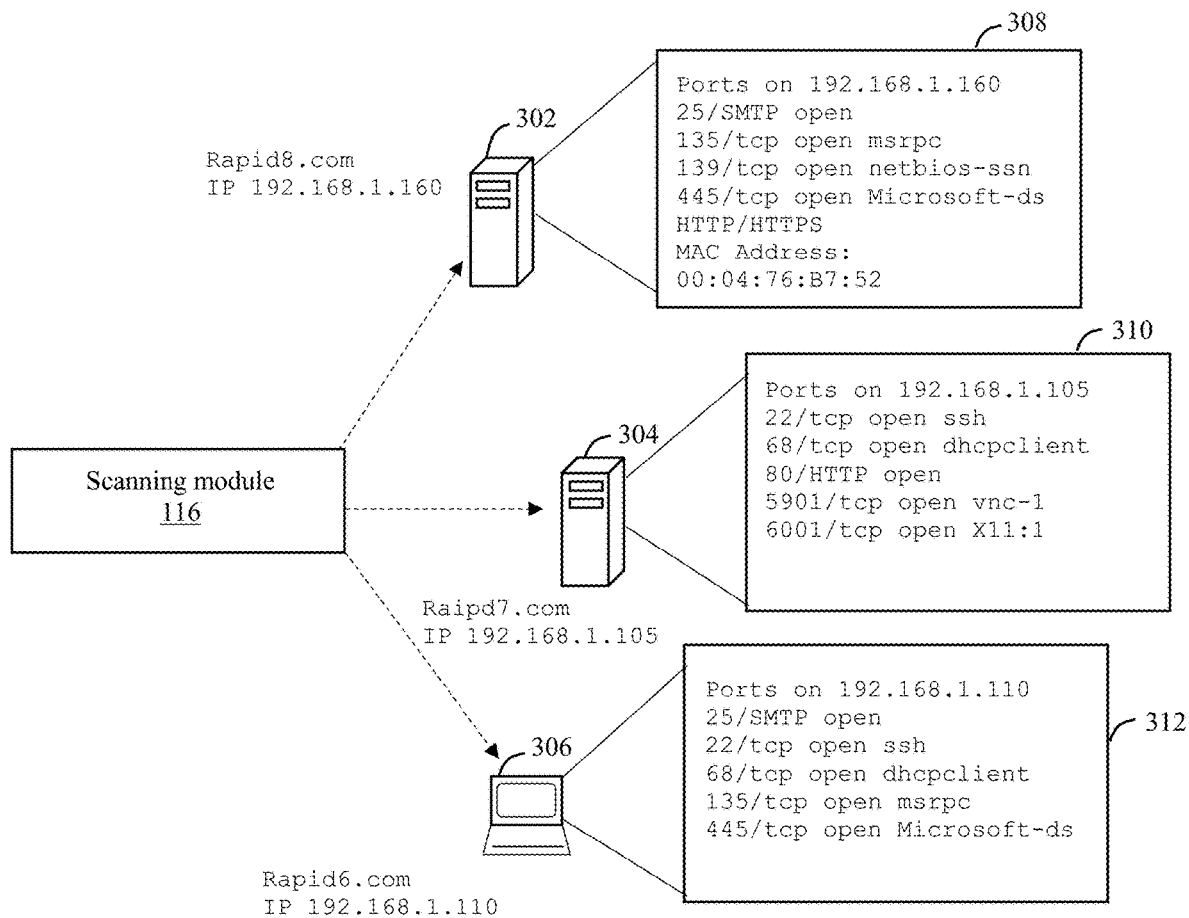

As seen in FIG. 3B, the scanning module 116 may return results 308 corresponding to domain 302, results 310 corresponding to domain 304, and results 312 corresponding to domain 306. These results 308-12 may provide insight regarding which ports are open on the domains and which processes or services are executing thereon. The ports that are open and the types of services executing on a permutated domain may provide valuable information regarding how the permutated domains are being used.

Figure 3C:
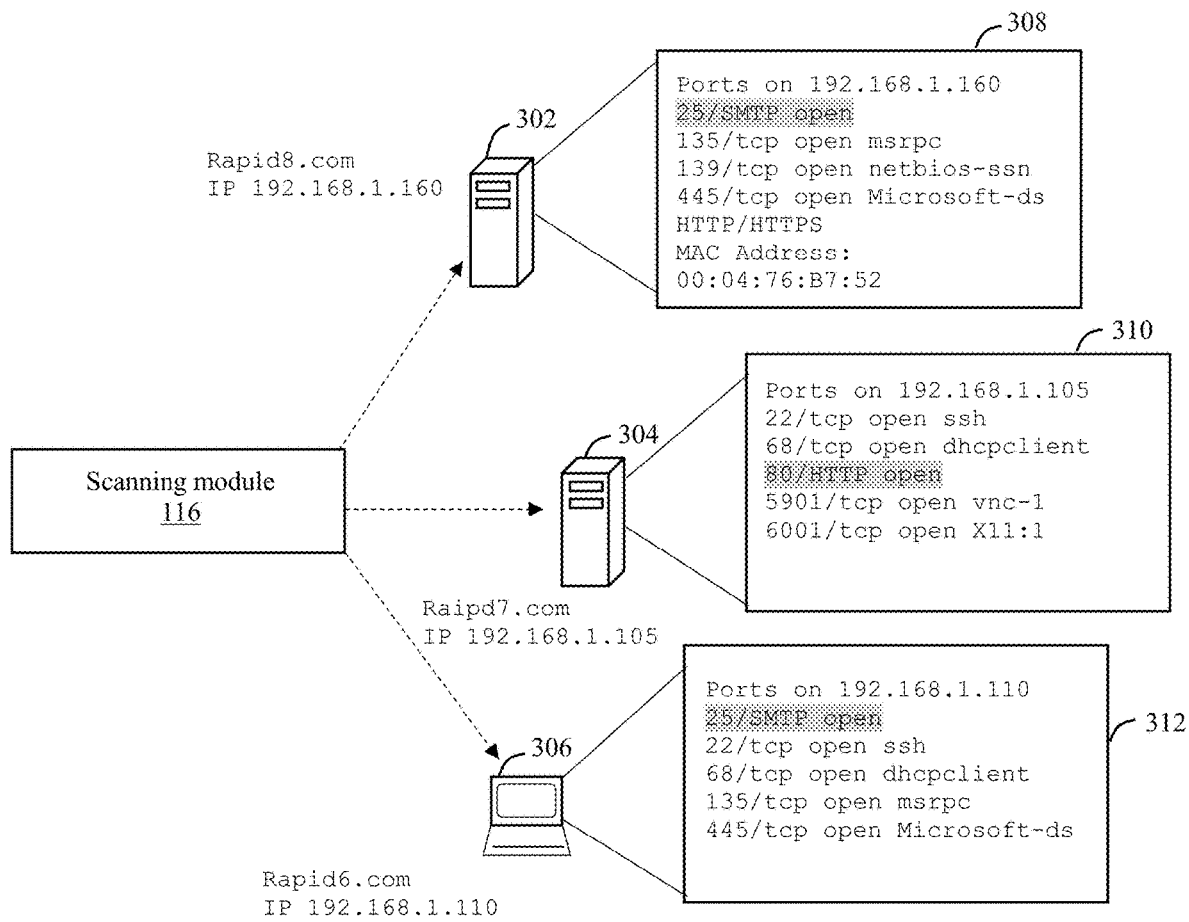

For example, and as seen in FIG. 3C, results 308 and 312 indicate that domains 302 and 306, respectively, each have port 25 open. Port 25 is designated for the Simple Mail Transfer Protocol (SMTP), which is used for routing emails between network locations. Accordingly, the results 308 and 312 may indicate that the associated permutated domains are likely being used for communicating emails. This may concern the user 106 or the organization, as these permutated domains may be sending out phishing emails to the organization's employees.

As another example, the results 310 indicate that domain 304 has port 80 open. Port 80 is designated for the Hypertext Transfer Protocol (HTTP), which defines how messages or requests are formatted between web browsers and web servers. Accordingly, the results 310 may indicate that the associated domain 304 is at least likely being used for serving one or more web pages. This may be of concern to the user 106 or the organization, as this permutated domain 304 may be hosting a fake web page that appears to be associated with the organization. As discussed previously, an unsuspecting employee may mistakenly visit this web page and may provide sensitive information such as credentials.

It follows that a user 106 would then want to know if anyone has interacted with these domains, as well as the nature of those interactions. For example, the user 106 of the organization may want to know which employees have visited a domain such as the domain 304, or which employees have received emails from domains 302 and 306.

The activity analysis module 118 may therefore monitor and capture traffic data involving employee devices 130 and 132 or other types of network devices or file transfer protocol (FTP) servers to see if anyone from within the organization has interacted with these domains. Similarly, the activity analysis module 118 may monitor traffic data to detect if these domains have reached out to any legitimate assets (or virtual security appliances such as honeypots) within or otherwise associated with the organization. The activity analysis module 118 may be configured in a variety of ways as long as it can gather data indicative of interactions or attempted interactions involving the permutated domains and employees or assets associated with an organization.

In some embodiments, the organization may set up virtual security appliances such as honeypots to monitor behavior on the organization's network(s). These virtual security appliances may appear similar to other assets or devices on a network, but may actually serve no real or legitimate purpose other than to gather data regarding threat actor behavior.

For example, threat actors may be under the mistaken belief that a virtual security appliance is associated with an employee who may have access to valuable information. The threat actors may be tempted to interact with these appliances, thinking they may be able to gain this information. In actuality, however, these appliances are not associated with an employee or real system and do not possess any valuable information. As the organization knows that these appliances are not associated with any real person or system, the organization can conclude that any interactions with the appliance are conducted by a threat actor.

Upon the activity analysis module 118 determining that an employee or some network device has interacted with one of these permutated domains, the threat prevention module 120 may autonomously implement one or more threat prevention, mitigation, or remediation procedures. The type of procedure implemented may vary and may depend on the nature of the detected interaction with a permutated domain.

For example, if an employee had interacted with domain 304 of FIG. 3 (which has port 80 for HTTP open), the interaction may have involved the employee providing their credentials to a fake login page. A threat actor would have possession of the employee's credentials, and could use these credentials to subsequently log in to the organization's network.

In this case, the threat prevention module 120 may first block the employee's credentials from subsequently being accepted on the organization's network. This would essentially render the threat actor's possession of the maliciously-obtained credentials meaningless. The threat prevention module 120 may also instruct the employee to update their credentials (e.g., username, password, security questions, or the like).

As another example, if an employee had interacted with the domain 302 of FIG. 3 (which has port 25 for SMTP open), the interaction may have involved the employee receiving an email, and then activating a link in the email or opening an attachment in the email. Unbeknownst to the employee, these actions may have executed harmful software on the employee's network device. This software may allow the threat actor to have access to the employee's device, view files thereon, escalate their privileges or the like.

In this case, the threat prevention module 120 may quarantine the employee's device on the network to prevent the threat actor from gaining access to or communicating with other locations on the network. The threat prevention module 120 may similarly execute any appropriate virus scans or the like to detect and remove any malware. These are only examples of actions that may be performed by the threat prevention module 120, and other actions may be implemented without departing from the scope of the embodiments described herein.

Referring back to FIG. 1, the alert module 122 may additionally or alternatively issue an alert to the user 106 informing the user 106 of the detected activity. The alert may be a visual-based alert, a text-based alert, an audio-based alert, a haptic-based alert, or some combination thereof.

The user interface 104 may also present to the user 106 data that caused the alarm. This may include the permutated domain, the nature of the interaction between an employee and the permutated domain, or the like. The user 106 may then take any further remedial action(s) as well.

Figure 4:
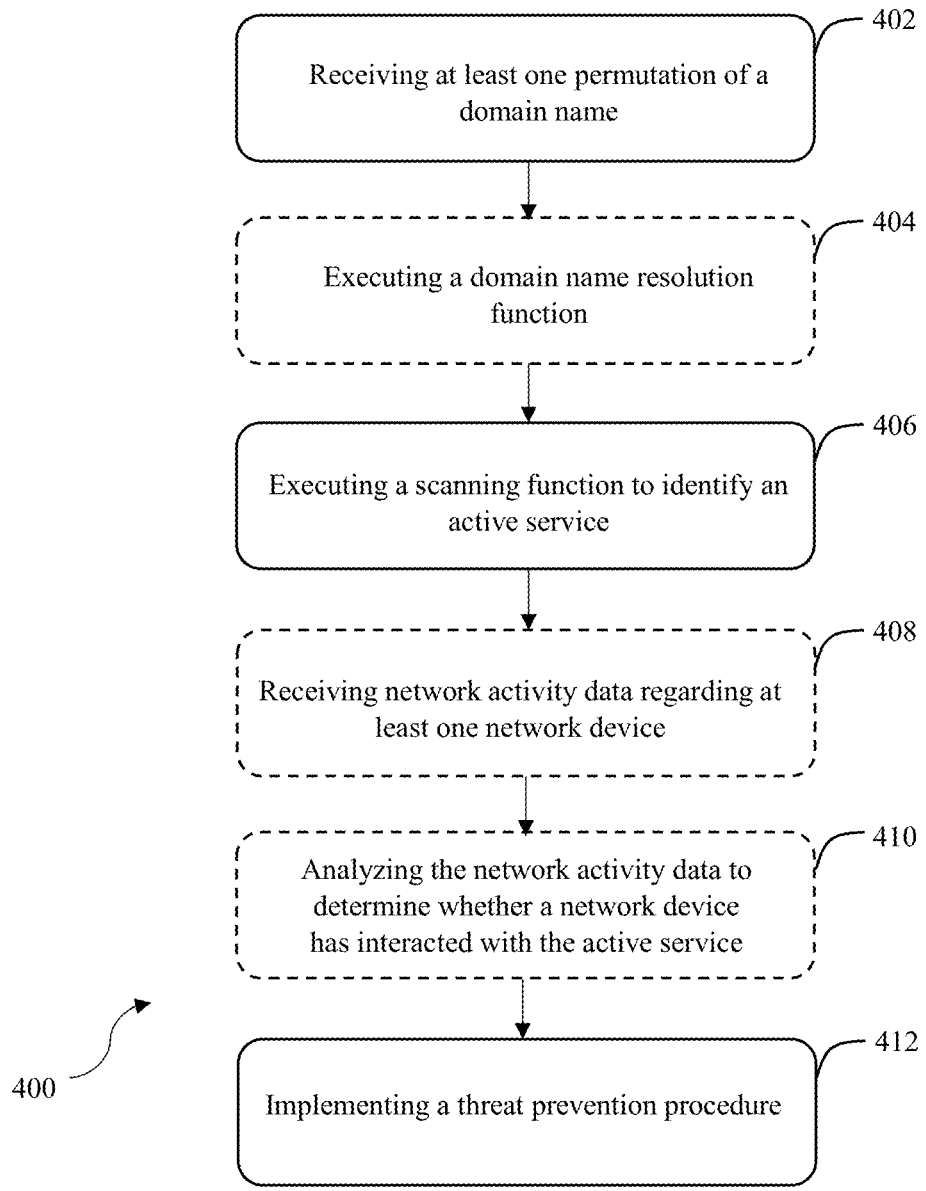
FIG. 4 depicts a flowchart of a method for identifying a network threat in accordance with one embodiment.

FIG. 4 depicts a flowchart of a method 400 for identifying a network threat in accordance with one embodiment. The system 100 of FIG. 1 or components thereof may perform the steps of method 400.

Step 402 involves receiving at least one permutation of a domain name, wherein the at least one permutation is registered with a domain name registrar. In accordance with step 402, the domain name may be the domain name of a legitimate organization or some other entity. The at least one received permutation, on the other hand, may be unassociated with the organization but instead is intended to appear associated with the organization. As discussed previously these permutations are generally intended to fool unsuspecting people into thinking the permutation is legitimate. For the purposes of method 400, a domain name may be "Rapid7" and a received permutation may be "Raipd7".

Step 404 involves executing a domain name resolution function to determine whether the at least one permutation resolves. This optional step ensures that a permutated domain name is not only registered but actually resolves (e.g., has an associated DNS entry). This step may therefore help preserve time and computing resources, as the systems and methods described herein would likely not need to examine non-resolving domain names further, as there would be no risk of them interacting with employees.

Step 406 involves executing a scanning function to identify an active service on the at least one permutation registered with the domain name registrar. This step may help determine how the permutated domain is being used. The scanning module 116 of FIG. 1 may perform this step, which may involve port scanning, ping sweeping, or the like. For example, the scanning function may identify services such as HTTP services, HTTPS services, SMTP services, DNS services, NTP services, and DHCP services.

Step 408 involves receiving network activity data regarding at least one network device on a network. This network activity data may be gathered by any suitable network monitoring device or tool.

Step 410 involves analyzing the network activity data to determine whether a network device has interacted with the active service. As discussed previously, the systems and methods described herein may then analyze network activity data to determine whether and to what degree an employee on an organization's network has interacted with a permutated domain or vice versa. For example, an employee may have opened a link or an attachment that was sent from a permutated domain, or may have visited a website hosted by the permutated domain.

Step 410 involves implementing a threat prevention procedure upon identifying an active service on the at least one permutation. Certain activity detected in step 408 may warrant one or more remedial, prevention, or mitigation procedures. These may include, but are not limited to, blocking a user associated with a network device from interacting with the permutation, preventing communications from the permutation, and blacklisting the permutation.

Various embodiments are described with reference to the accompanying drawings, which form a part hereof, and which show specific exemplary embodiments. However, the concepts of the present disclosure may be implemented in many different forms and should not be construed as limited to the embodiments described herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The previous detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the previous disclosure. The appearances of the phrase "in one embodiment" in various places in the specification are not necessarily all referring to the same embodiment. The appearances of the phrase "in some embodiments" in various places in the specification are not necessarily all referring to the same embodiments.

Some portions of the preceding description are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the previous discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs in accordance with the teachings herein, or it may prove convenient to construct more specialized apparatus to perform one or more method steps. The structure for a variety of these systems is discussed in the preceding description. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method comprising:
receiving at least one permutation of a domain name associated with a network threat, wherein the at least one permutation is registered with a domain name registrar;
executing a scanning function on the at least one permutation of the domain name to determine open ports associated with the at least one permutation of the domain name and identify an active service on an open port associated with the at least one permutation of the domain name;
capturing honeypot data using one or more honeypot devices associated with a network, wherein the one or more honeypot devices are implemented as virtual security appliances;
searching the honeypot data to determine that the active service on the at least one permutation of the domain name has attempted contact with at least one of the one or more honeypot devices;
receiving network activity data regarding at least one network device on a network;
analyzing the network activity data to determine that a network device on the network has interacted with the active service, and in response:
implementing a threat prevention procedure on the network device.

2. The method of claim 1 wherein implementing the threat prevention procedure further comprises:
scanning the network device for malware,
removing malware from the network device,
blocking a user credential of a user associated with network device from being used to access the network, or
quarantining the network device from communicating with other devices on the network.

3. The method of claim 1 wherein the network device is an file transfer protocol (FPT) server associated with the network.

4. The method of claim 1 wherein the network device is a user device in the network associated with a user.

5. The method of claim 1 further comprising executing a domain name resolution function to determine whether the at least one permutation resolves, wherein the threat prevention procedure is implemented upon identifying an active service on the at least one permutation resolves.

6. The method of claim 1 further comprising:
consulting a database of a list of expected domain names; and
filtering a permutation that matches an expected domain name.

7. The method of claim 1 wherein the active service is selected from the group consisting of a Hypertext Transfer Protocol (HTTP) service, a Hypertext Transfer Protocol Secure (HTTPS) service, a Simple Mail Transfer Protocol (SMTP) service, a Domain Name System (DNS) service, a Network Time Protocol (NTP) service, and a Dynamic Host Configuration Protocol (DHCP) service.

8. The method of claim 1 wherein implementing the threat prevention procedure includes at least one of blocking a user associated with a network device from interacting with the permutation, preventing communications from the permutation, and blacklisting the permutation.

9. The method of claim 1 wherein receiving the at least one permutation includes:
   receiving a domain name of interest;
   executing a function to generate a plurality of permutations of the received domain name of interest; and
   generating a list of permutated domain names from the generated plurality of permutations.

10. The method of claim 9 wherein the plurality of permutations are generated based on one or more machine learning procedures.

11. A system comprising:
   a processor configured to execute instructions stored on a memory to:
      receive, via an interface, at least one permutation of a domain name associated with a network threat, wherein the permutation is registered with a domain name registrar;
      execute a scanning function on the at least one permutation of the domain name to determine open ports associated with the at least one permutation of the domain name and identify an active service on an open port associated with the at least one permutation of the domain name;
      capture honeypot data using one or more honeypot devices associated with a network, wherein the one or more honeypot devices are implemented as virtual security appliances;
      search the honeypot data to determine that the active service on the at least one permutation of the domain name has attempted contact with at least one of the one or more honeypot devices;
      analyze network activity data regarding a network device on a network to determine that the network device has interacted with the active service, and in response:
         implement a threat prevention procedure on the network device.

12. The system of claim 11 wherein to implement the threat prevention procedure, the processor is configured to:
   cause the network device to be scanned for malware,
   cause malware to be removed from the network device,
   cause a user credential of a user associated with network device to be blocked from being used to access the network, or
   cause the network device to be quarantined from other devices on the network.

13. The system of claim 11 wherein the network device is an file transfer protocol (FPT) server associated with the network.

14. The system of claim 11 wherein the network device is a user device in the network associated with a user.

15. The system of claim 11 wherein the processor is further configured to execute a domain name resolution function to determine whether the at least one permutation resolves, wherein the threat prevention procedure is implemented upon identifying an active service on the at least one permutation resolves.

16. The system of claim 11 wherein the processor is further configured to:
   consult a database of a list of expected domain names; and
   filter a permutation that matches an expected domain name.

17. The system of claim 11 wherein the active service is selected from the group consisting of a Hypertext Transfer Protocol (HTTP) service, a Hypertext Transfer Protocol Secure (HTTPS) service, a Simple Mail Transfer Protocol (SMTP) service, a Domain Name System (DNS) service, a Network Time Protocol (NTP) service, and a Dynamic Host Configuration Protocol (DHCP) service.

18. The system of claim 11 wherein the threat prevention procedure includes at least one of blocking a user associated with a network device from interacting with the permutation, preventing communications from the permutation, and blacklisting the permutation.

19. The system of claim 11 wherein the processor is further configured to:
   receive a domain name of interest via the interface;
   execute a function to generate a plurality of permutations of the received domain name of interest; and
   generate a list of permutated domain names from the generated plurality of permutations.

20. The system of claim 11 wherein the processor is further configured to generate the plurality of permutations based on one or more machine learning procedures.

* * * * *